US008886393B2

(12) United States Patent
Edwards et al.

(10) Patent No.: US 8,886,393 B2
(45) Date of Patent: Nov. 11, 2014

(54) VEHICLE TELEMATICS COMMUNICATION FOR PROVIDING IN-VEHICLE REMINDERS

(75) Inventors: Ryan M. Edwards, Macomb, MI (US); Heather C. Michalak, Macomb, MI (US)

(73) Assignee: General Motors LLC, Detroit, MI (US)

( * ) Notice: Subject to any disclaimer, the term of this patent is extended or adjusted under 35 U.S.C. 154(b) by 1193 days.

(21) Appl. No.: 12/640,810

(22) Filed: Dec. 17, 2009

(65) Prior Publication Data

US 2011/0153148 A1 Jun. 23, 2011

(51) Int. Cl.
*H04M 11/02* (2006.01)
*G07C 5/00* (2006.01)

(52) U.S. Cl.
CPC .................................... *G07C 5/008* (2013.01)
USPC .......... 701/30; 701/29.1; 701/29.4; 701/29.6; 701/31.4; 701/31.6; 701/32.1; 340/425.5; 340/438; 340/442

(58) Field of Classification Search
None
See application file for complete search history.

(56) References Cited

U.S. PATENT DOCUMENTS

| | | | | |
|---|---|---|---|---|
| 5,006,829 | A * | 4/1991 | Miyamoto et al. | 340/459 |
| 5,705,977 | A * | 1/1998 | Jones | 340/457.2 |
| 5,819,201 | A * | 10/1998 | DeGraaf | 701/29.4 |
| 6,131,060 | A * | 10/2000 | Obradovich et al. | 701/49 |
| 6,359,570 | B1 * | 3/2002 | Adcox et al. | 340/902 |
| 6,429,773 | B1 * | 8/2002 | Schuyler | 340/425.5 |
| 6,927,682 | B1 * | 8/2005 | Touhey et al. | 340/457.4 |
| 7,266,434 | B2 * | 9/2007 | Mc Cullough et al. | 701/36 |
| 7,269,482 | B1 * | 9/2007 | Shultz et al. | 701/1 |
| 7,449,995 | B1 * | 11/2008 | Clanton-Holloway | 340/438 |
| 7,532,962 | B1 * | 5/2009 | Lowrey et al. | 701/32.3 |
| 7,715,961 | B1 * | 5/2010 | Kargupta | 701/29.3 |
| 7,747,365 | B1 * | 6/2010 | Lowrey et al. | 701/31.4 |
| 7,778,752 | B1 * | 8/2010 | Hunt et al. | 701/36 |
| 7,809,481 | B2 * | 10/2010 | Okada et al. | 701/31.4 |
| 7,904,219 | B1 * | 3/2011 | Lowrey et al. | 701/32.3 |
| 8,032,296 | B2 | 10/2011 | Bucchieri | |
| 8,041,779 | B2 * | 10/2011 | Habaguchi et al. | 709/219 |
| 8,082,076 | B2 * | 12/2011 | Sells et al. | 701/31.6 |
| 8,095,261 | B2 * | 1/2012 | Howell et al. | 701/29.1 |
| 8,306,560 | B2 * | 11/2012 | Krause et al. | 455/466 |
| 8,306,921 | B2 * | 11/2012 | Kalik et al. | 705/319 |
| 8,421,864 | B2 * | 4/2013 | Tano | 348/148 |
| 8,452,479 | B2 * | 5/2013 | Nath et al. | 701/29.4 |
| 8,594,861 | B2 * | 11/2013 | Rovik et al. | 701/2 |
| 2002/0049535 | A1 | 4/2002 | Rigo et al. | |
| 2002/0091706 | A1 * | 7/2002 | Anderson et al. | 707/104.1 |
| 2003/0114965 | A1 * | 6/2003 | Fiechter et al. | 701/29 |
| 2003/0171964 | A1 | 9/2003 | Center et al. | |
| 2004/0093134 | A1 * | 5/2004 | Barber et al. | 701/29 |

(Continued)

*Primary Examiner* — Jonathan M Dager
(74) *Attorney, Agent, or Firm* — Anthony Luke Simon; Reising Ethington P.C.

(57) ABSTRACT

A method and system for providing a reminder message to a user associated with a vehicle via a vehicle telematics unit. The method carried out by the system involves sending to a user an email, web page or other communication that contains a user selectable reminder request, receiving the reminder request from the user, setting a reminder trigger in the vehicle, and then carrying out a requested action in response to occurrence of the trigger. The requested action can be presentation of a reminder message to the occupant and/or establishment of a call from the vehicle to a call center or other remote location to obtain services, such as telematics subscription renewal, or dealer service. The user-selectable reminder request can be implemented in the communication as a virtual button that mimics the look of a physical button installed in the car that is used to provide telematics services.

20 Claims, 3 Drawing Sheets

(56) References Cited

U.S. PATENT DOCUMENTS

| | | | | |
|---|---|---|---|---|
| 2004/0093155 | A1* | 5/2004 | Simonds et al. | 701/200 |
| 2004/0203696 | A1* | 10/2004 | Jijina et al. | 455/420 |
| 2004/0203974 | A1* | 10/2004 | Seibel | 455/517 |
| 2004/0249532 | A1* | 12/2004 | Kelly et al. | 701/30 |
| 2004/0259524 | A1* | 12/2004 | Watkins et al. | 455/405 |
| 2005/0071356 | A1* | 3/2005 | Wu | 707/100 |
| 2005/0137763 | A1* | 6/2005 | Watkins et al. | 701/33 |
| 2005/0222754 | A1 | 10/2005 | Meisler et al. | |
| 2006/0017565 | A1* | 1/2006 | Addy | 340/539.14 |
| 2006/0089097 | A1* | 4/2006 | Wang et al. | 455/3.02 |
| 2006/0212300 | A1* | 9/2006 | Resser et al. | 705/1 |
| 2006/0229778 | A1* | 10/2006 | Obradovich et al. | 701/33 |
| 2007/0043487 | A1 | 2/2007 | Krzystofczyk et al. | |
| 2007/0167147 | A1* | 7/2007 | Krasner et al. | 455/404.2 |
| 2007/0173992 | A1* | 7/2007 | McCutchen et al. | 701/29 |
| 2007/0299565 | A1* | 12/2007 | Oesterling | 701/1 |
| 2008/0004788 | A1* | 1/2008 | Dorfstatter et al. | 701/117 |
| 2008/0021605 | A1* | 1/2008 | Huber et al. | 701/30 |
| 2008/0021964 | A1* | 1/2008 | Inbarajan | 709/206 |
| 2008/0027604 | A1* | 1/2008 | Oesterling | 701/30 |
| 2008/0027605 | A1* | 1/2008 | Oesterling | 701/33 |
| 2008/0027606 | A1* | 1/2008 | Helm | 701/33 |
| 2008/0039995 | A1* | 2/2008 | Reeser | 701/30 |
| 2008/0119980 | A1* | 5/2008 | Ross et al. | 701/33 |
| 2009/0089134 | A1* | 4/2009 | Uyeki | 705/9 |
| 2009/0106036 | A1* | 4/2009 | Tamura et al. | 705/1 |
| 2009/0134991 | A1* | 5/2009 | Shuart | 340/457 |
| 2009/0177351 | A1* | 7/2009 | Watkins et al. | 701/30 |
| 2009/0286504 | A1* | 11/2009 | Krasner et al. | 455/404.1 |
| 2010/0042498 | A1 | 2/2010 | Schalk | |
| 2010/0214428 | A1* | 8/2010 | Wood et al. | 348/222.1 |
| 2011/0166739 | A1* | 7/2011 | Oesterling | 701/30 |
| 2012/0029759 | A1 | 2/2012 | Suh et al. | |
| 2012/0029964 | A1* | 2/2012 | Tengler et al. | 705/7.19 |

* cited by examiner

VEHICLE TELEMATICS COMMUNICATION FOR PROVIDING IN-VEHICLE REMINDERS

TECHNICAL FIELD

The present invention generally relates to vehicle telematics systems and, more particularly, to techniques for providing in-vehicle reminders via a telematics unit.

BACKGROUND

Telematics units have been used with vehicles to provide a variety of services to subscribers of these services. For instance, a telematics service subscriber can receive customized GPS navigation directions, vehicle tracking in case of a theft, emergency services in case of air bag activation, unlocking of vehicle doors, slowing and disabling a vehicle by a law enforcement officer, etc. Furthermore, the subscriber may receive a detailed diagnostic report through a service website or as an email describing the operating condition of the vehicle. This report may also suggest some urgent or preventive services needed.

SUMMARY OF THE INVENTION

According to one embodiment, there is presented a method of providing a reminder to a subscriber associated with a vehicle via a vehicle telematics unit, comprising the steps of (a) providing a communication containing a reminder request option to the subscriber via a processing device located remotely of the vehicle; (b) receiving a reminder request from the subscriber via the remotely located processing device; (c) setting a reminder trigger for the vehicle; and (d) subsequently carrying out a requested action at the vehicle in response to occurrence of the reminder trigger.

In another embodiment, there is presented a method of providing a reminder to a subscriber associated with a vehicle via a vehicle telematics unit, comprising the steps of (a) sending to a user a communication that contains a user selectable reminder request; (b) receiving the reminder request from the user; (c) establishing a data session between the call center and the vehicle telematics unit; (d) sending a trigger to the vehicle from the call center via the data session; (e) receiving a call from the vehicle following occurrence of the trigger; and (f) providing additional services to the user concerning the reminder request.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The system and methods described below are directed to different embodiments of an approach that enables a subscriber to set an in-vehicle reminder from a location remote of the vehicle itself. This can be helpful, for example, in instances in which the subscriber is not physically at the vehicle, but wishes to be reminded to take some action the next time he or she is present at the vehicle. For example, where the subscriber receives diagnostic information such as a check engine warning via email or other electronically-supplied communication on a computer, mobile phone, or other processing device at a location away from the vehicle, such that they are not able at that moment to utilize the vehicle telematics unit to call an advisor at the call center for information or help concerning the warning received. In such an instance, the embodiments described below enable the subscriber to set a reminder that, once they are again in the vehicle, will either automatically contact the call center or remind them of their desire to contact the call center for assistance concerning the diagnostic information received. Reminders for other service needs can also be set as well; for example, to renew or extend a subscription for telematics services or satellite radio services. As another example, the subscriber may wish to be reminded in the vehicle of some other action to be taken when in the vehicle that may not involve any communication with a call center; for example, a reminder to carry out a particular errand. To carry out these in-vehicle reminders, the disclosed methods enable a telematics central facility to provide the subscriber with a user-selectable reminder request option that is sent to the subscriber's cell phone, PDA, computer, or other processing device that the user can then select to setup a reminder trigger in their vehicle. If the user initiates the reminder request, it is sent to the call center which then establishes a data session between the call center and the vehicle telematics unit, sends a reminder trigger to the vehicle, and can then subsequently take an appropriate action upon occurrence of the trigger. This action can include presenting a reminder to the subscriber or other vehicle occupant, and/or initiating a telephone call with the call center via the telematics unit. During the call, the call center can provide additional information and other services to the driver.

Communications System—

Figure 1:
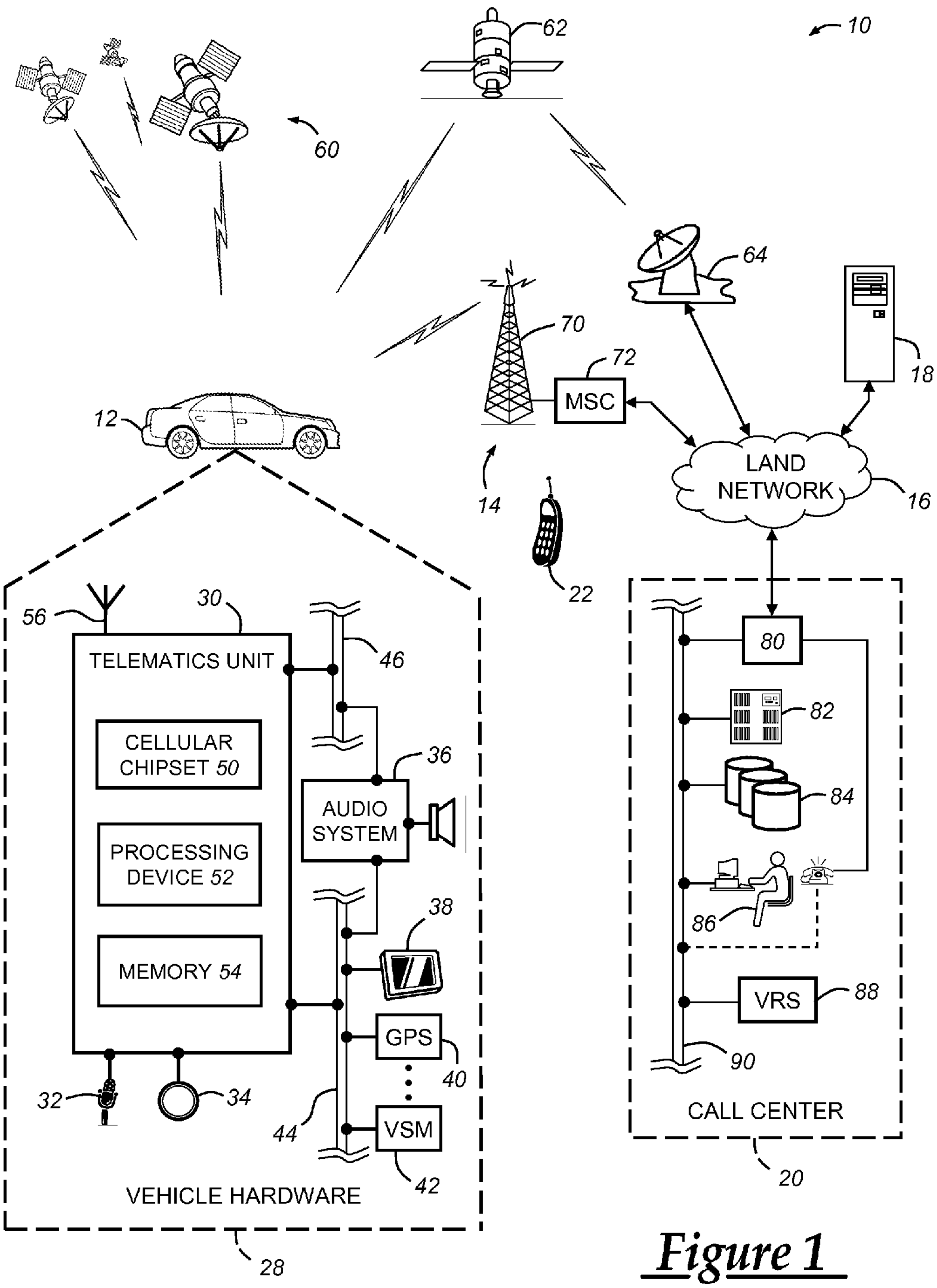
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live adviser or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Where the computer 18 is used by a subscriber or other user to access telematics services, it can be implemented using any suitable type of computer (e.g., a desktop computer or portable computer). In this regard, computer 18 is used as a processing device located remotely of the vehicle, even though as a portable computer it may occasionally be located at the vehicle.

Apart from computer 18, other types of remotely located processing devices can be used. For example, a mobile device 22 can be used and can be one of a number of such communication devices used by subscribers. Each mobile device 22 is a processing device that can be used for one or more purposes, such as voice communication, text messaging, email, web browsing, gaming, camera, video recording, sending and receiving photos and videos, audio player (e.g., MP3), radio, GPS navigation, personal organizer, to name but a few. In the illustrated embodiment, mobile device 22 is a mobile phone also known as a cell or cellular phone that connects to a cellular network such as system 14. In another embodiment, mobile device 22 can be a personal digital assistant (PDA) that may or may not provide telephony services.

Various other types of suitable processing devices will be apparent to those skilled in the art.

Call center 20 is designed to provide the vehicle electronics 28 with a number of different system back-end functions and, according to the exemplary embodiment shown here, generally includes one or more switches 80, servers 82, databases 84, live advisers 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live adviser phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live adviser 86, it will be appreciated that the call center can instead utilize VRS 88 as an automated adviser or, a combination of VRS 88 and the live adviser 86 can be used.

Method—

Figure 2:
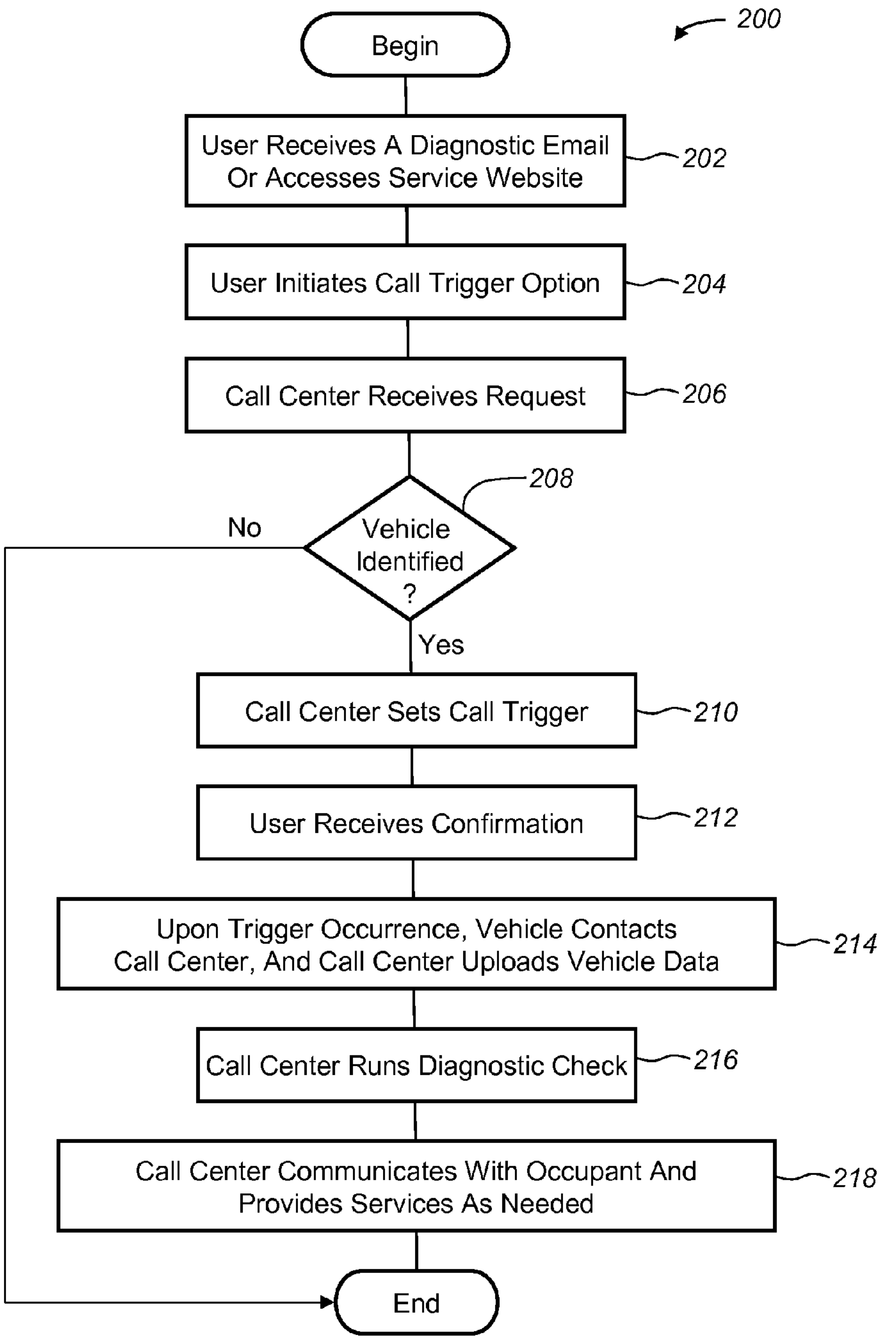
FIG. 2 is a flowchart depicting one embodiment of a method of providing an in-vehicle reminder via a vehicle telematics unit.

Turning now to FIG. 2, there is shown a method 200 for providing a reminder to a subscriber associated with a vehicle via a vehicle telematics unit. A subscriber is a person or entity who either has legal title to the vehicle (e.g., a purchaser, corporation, parent) or has possession of the vehicle for regular use (e.g., a lessee, employee driving a company car, licensed minor), or both (e.g., a purchaser driver), and who has opted to receive vehicle information from a telematics service. The method starts at step 202 and begins by providing a communication to the subscriber that contains an option for the subscriber to request an in-vehicle reminder. This communication is provided via a processing device located remotely of the vehicle. The communication can be an email or other electronic message sent to the subscriber, or a web page or other digital content sent in response to a request sent via the processing device. Thus, for example, if the subscriber accesses a telematics service provider website (e.g., call center 20) via computer 18 or mobile device 22 (e.g., via a web browser) it can return to the subscriber a web page that includes the option of requesting an in-vehicle reminder. Or, for example, where the subscriber receives a diagnostic email through computer 18 or mobile device 22 from call center 20, the email can include this option to set the reminder. Where a diagnostic email is used to send the vehicle diagnostic information, it can be implemented as described in US Patent Application Pub. No. US 2007-0173992A1, the entire contents of which are hereby incorporated by reference. A diagnostic email comprises specific or general information concerning a monitored vehicle component, system, or operating condition. Specific information may be, for example, the amount of oil life remaining, whereas a general information may be, for example, a graphical indicator that indicates whether some action is required to address one or more vehicle conditions and possibly the importance or severity of the vehicle condition.

Whether provided by email, website access or otherwise, the subscriber is given the option of requesting a reminder in the vehicle. Thus, in step 204, the user can select this option by clicking on link or button, or by utilizing any other suitable means provided to initiate the call trigger request. Thus, in any embodiment, such as where a diagnostic email or service website is used, a link can be included which is then used to initiate a call trigger request to remind the subscriber that they wish to contact the call center concerning the diagnostic information received. The link, button, drop-down menu, etc. can be implemented using any suitable programming or scripting language (e.g., HTML, XHTML, SGML, JHTML, JavaScript, etc.). In addition, the link could trigger an email to be sent to call center 20. The link may be preceded by a description and/or instructions on how to initiate the call trigger option. For instance, in one embodiment, a "Click here to initiate a reminder call" statement can precede the link. In another embodiment, a drop-down menu or list can include "Reminder Call" option and just below it "Do Not Call" option where the user may select either option. These options can also permit the user to identify one or more maintenance or telematics service issues to which the reminder is to relate, and that information is sent to the call center as a part of the request.

In another embodiment, selection of the reminder option by the subscriber can be implemented by using a button displayed on the processing device that mimics the pushbutton 34. Thus, for example, the pushbutton 34 installed in the vehicle can be used to permit the subscriber to press the pushbutton 34 to obtain various telematics services, as described above, including, for example, placing a data or voice communication to the call center 20 for these services. This pushbutton 34 can have visual features that make it easily identifiable, such as certain color(s), graphics, and/or text printed on the face of the pushbutton. The button displayed on the processing device can be a virtual button that mimics the physical button 34 from the vehicle by including the same or similar color(s), graphics, or text such that the general function of the displayed virtual button is easily recognizable by the subscriber. Then, by allowing the subscriber to select this virtual button on the processing device, the associated programming can be used to send the reminder request to the call center 20 or elsewhere. Thus, this virtual button and its associated functionality can be included in the communication sent to the subscriber (e.g., in a diagnostic email or returned web page). As discussed above, apart from directly sending a reminder request to the call center in response to the selection of the virtual button by the subscriber, there can also be provided a drop-down menu or other option display presented to the user to enable them to make different choices. These choices can include the means by which the reminder is carried out, such as by immediately placing a call the call center via the processing device, or by carrying out some action the next time the subscriber is in the vehicle; for example, by presenting a visual or audible in-vehicle reminder to the subscriber, or placing an automatic in-vehicle call to the call center 20. These choices can also permit the user to associate the reminder with one or more types of services or vehicle maintenance or operational issues, and this can be done, for example, using a list of selectable items that permits the user to select one or more of the items by, for example, a check box or radio button displayed next to each item.

In step 206, call center 20 receives the reminder (or trigger) request. As noted above, this request can include a code or other information associating the reminder with a particular vehicle maintenance issue (e.g., schedule oil change, check tire pressure, etc.) or telematics service issue (e.g., renew a telematics or cellular service subscription). Where the in-vehicle reminder was initiated via a diagnostic email, some or all of the vehicle information (VIN, mileage diagnostic results, services to be performed, etc.) can be automatically received with the call reminder request. In other embodiments, subscriber information can be obtained in other ways, such as by having the subscriber log into a secure account associated with the vehicle 12. The information received can be any information sufficient for call center 20 to identify vehicle 12. Later, in step 208, call center 20 verifies the vehicle identification data and service subscription data. If the verification is unsuccessful then the method can ends or call center 20 may send a reply consisting of an email, a text message, web page, or other communication. The reply may include a request to contact call center 20 because the subscriber information could not be verified, subscriber subscription has been expired, or for any other reason. In case the verification is successful, the method proceeds to the next step.

In step 210, call center 20 sets the reminder trigger. In the embodiment of FIG. 2, this trigger will be used to initiate a call to the call center 20 under circumstances in which a person is determined to be at the vehicle 12 and thus, likely to be available for communicating with the call center 20. In one embodiment, setting the trigger can be achieved by sending a telematics command to enable a code number already preprogrammed in the vehicle 12 which corresponds to the reminder call option. In a second embodiment, an entire command may be sent to the telematics unit 30 or some other VSM 42 to program the vehicle to perform a reminder call option. The trigger may wait for a series of events (e.g., vehicle ignition is turned on and all doors are closed, etc.) or just an event (e.g., vehicle ignition is turned on). However, the method preferably uses a trigger that is responsive to vehicle operation by an operator. Furthermore, this trigger can be implemented in a variety of different ways. For instance, an ignition trigger that occurs upon the vehicle ignition being activated can be used. In another instance, a mileage trigger that occurs after a certain number of miles has elapsed can be used. Other such triggers will become apparent to those skilled in the art.

Once the call center 20 sets the trigger, then it sends a confirmation to the service subscriber. Call center 20 may send a confirmation consisting of an email (e.g., if the request has been sent through an email), a text message (e.g., if the request has been sent through a cell phone, PDA, etc.), a web page (e.g., if the request has been sent through a service website), a preferred method desired by the subscriber and requested while subscribing to the telematics service or at a later time, etc. or a combination of any of these. The confirmation message may confirm that the call reminder option has been activated in the vehicle. In addition, the confirmation message may provide some contact information of the call center 20 if there is a need to contact the call center. The contact information may include phone number, email address, email link, or any other suitable contact method.

Upon a trigger condition occurrence, vehicle 12 can take a variety of actions. In one embodiment, the telematics unit 30 initiates a call to the call center 20 which will upload the vehicle 12 data (step 214). This involves the telematics unit 30 automatically placing a call to the call center 20 upon occurrence of the trigger, followed by the call center 20 uploading vehicle data. Vehicle data is data related to a particular vehicle, which may include vehicle 12 identification number, mileage, GPS coordinates, subscriber name, account number, and driver license, etc. In another embodiment, the vehicle presents a reminder to the occupant, such as by displaying a text reminder or playing an audible reminder. The audible reminder can either be a general reminder message or something specific that is associated with the particular maintenance or telematics service issue originally identified in the reminder request sent to the call center. The audible message can be one that is downloaded from the call center or elsewhere at the time of presentation to the occupant, or can be pre-stored at the vehicle.

Where diagnostic data is uploaded, then at step 216, the call center 20 runs an optional diagnostic check to receive the current condition of vehicle 12. In one embodiment, call center 20 sends a command through telematics unit 30 to VSM 42 to run a diagnostic check at the vehicle. The check may include obtaining any diagnostic trouble codes, remaining oil life, etc. Later, VSM 42 sent the diagnostic check results to call center 20 through telematics unit 30. Then, call center 20 processes the results in order to communicate them to vehicle 12 occupant.

At step 218, call center 20 communicates with vehicle 12 occupant and provides services as needed. Advisor 86 communicates with the occupant over the call initiated by the vehicle per step 214. Advisor 86 may inform the occupant about the vehicle 12 current condition and/or any recommendation to service vehicle 12. Later, advisor 86 can additionally provide services as needed, such as renewal of a cellular telephone or satellite radio subscription. Other possible services include providing a list of service dealers to the occupant, setting up an appointment for the vehicle occupant to service the vehicle 12 at a service dealer, connecting the occupant with a desired service dealer advisor, etc. In one embodiment, call center 20 sends an email with the vehicle information and desired appointment time to a service dealer and request from the service dealer advisor to contact the occupant. In a second embodiment, call center 20 places the occupant on hold while making a phone call to a service dealer during which an appointment will be setup for the occupant. In a third embodiment, call center 20 places the occupant call on hold, makes a phone call to a service dealer and connects the occupant and the service dealer calls together. Of course, these are only some of embodiments possible since others will be apparent to those skilled in the art. The process ends at this step.

Figure 3:
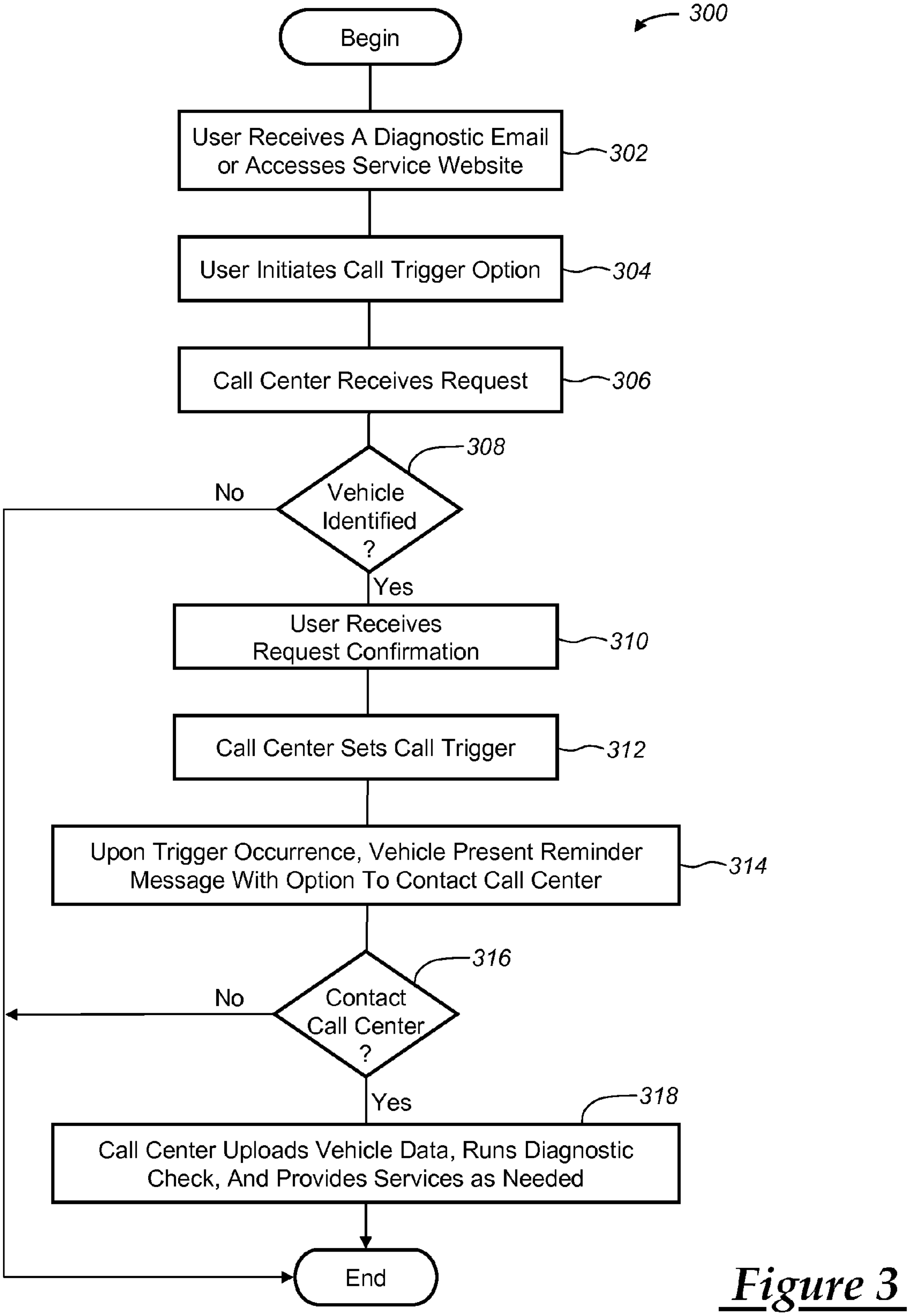
FIG. 3 is a flowchart showing a second embodiment of a method of providing an in-vehicle reminder via a vehicle telematics unit.

Turning now to FIG. 3, a second embodiment will be described. The portions of this embodiment in common with or similar to that of FIG. 2 can be carried out as described above. This embodiment differs from that of FIG. 2 in that the user receives a confirmation to the reminder call request once the vehicle has been identified, rather than waiting until later when the call center actually sets the call trigger in the vehicle. Another difference between both embodiments is that the vehicle presents a reminder message with option to contact call center 20, rather than initiating a phone call by the vehicle to the call center 20 upon trigger occurrence as described in the first embodiment. Hence, in the second embodiment, the occupant has the option to either contact or not to contact the call center 20 upon occurrence of trigger and presentation of the reminder message. In yet other embodiments, as noted above, no call need be placed, but rather the reminder can be presented in the vehicle to the occupant without contacting the call center.

The method 300 begins in step 302 where the user receives a diagnostic email or accesses a service website. Then, the user initiates a reminder call trigger option at step 304. At step 306, the call center 20 receives the reminder call request along with vehicle 12 identification data. Later, the vehicle 12 can be either identified or not (step 308). In case it is not identified the process ends. However, in case it is identified then the user receives a confirmation for the requested reminder call immediately (step 310). Later, the call center 20 sets the call trigger in the vehicle 12 through telematics unit 30 (step 312). These steps can be implemented as discussed above in connection with FIG. 2.

Upon trigger occurrence, vehicle 12 presents a reminder message with an option to contact the call center 20 (step 314). The implementation and presentation of the reminder message can be processed in a variety of ways. For instance, the message can be pre-stored at the vehicle 12 (e.g., such as during manufacturing or initial setup of the vehicle or its telematics unit) before presentation to the occupant. In another instance, the message can be downloaded over a dedicated call following occurrence of trigger. Therefore, the presentation of the message can be implemented by either contacting the call center 20 to retrieve the message or without the need for contacting the call center to retrieve it. Furthermore, the message presentation may take a variety of forms. For example, the message presentation may be an audible message played within the vehicle 12 using audio system 36, or a graphic one displayed on a visual display 38, or any other combinations. The message can include a request to place a call to the call center 20 to speak to an advisor, a request to hold to speak to an advisor, or any other requests. In one embodiment, the message requests that the occupant contact the call center 20, for example, by a manually initiated return call which the occupant can initiate by pressing button 34, providing a voice command via microphone 32, or using mobile device 22 to contact the call center. This provides the occupant with the ability to decide whether or not they wish to contact the call center 20 (step 316).

If the occupant decides not to contact the call center 20 then the process ends. In the event the occupant does contact the call center 20 then, if needed or helpful the telematics unit 30 can run a diagnostic check or data can be uploaded to the call center 20 where diagnostics can also be run, and an advisor at the call center 20 can then provide services to the driver (step 318) as discussed above with connection with FIG. 2. The process then ends.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of providing a reminder to a subscriber associated with a vehicle via a vehicle telematics unit, comprising the steps of:

(a) providing a communication containing an in-vehicle reminder request option to the subscriber alone with an option to contact a call center via a processing device located remotely of the vehicle;

(b) receiving an in-vehicle reminder request, a request to contact the call center, or both from the subscriber via the remotely located processing device;

(c) setting a reminder trigger for the vehicle the activation of which causes the presentation of the in-vehicle reminder; and (d) subsequently carrying out a requested action at the vehicle in response to occurrence of the reminder trigger.

2. The method of claim 1, wherein step (a) further comprises providing the communication containing the in-vehicle reminder request option via a web page sent to the processing device.

3. The method of claim 1, wherein step (a) further comprises providing the subscriber with a diagnostic email containing the in-vehicle reminder request option.

4. The method of claim 1, wherein the vehicle telematics unit includes a physical pushbutton in the vehicle that is used in conjunction with telematics services delivered via the telematics unit, wherein step (a) further comprises providing the subscriber with a communication that includes a selectable virtual button that mimics the look of the physical pushbutton, and wherein step (b) further comprises responding to selection of the virtual button via the processing device by sending the in-vehicle reminder request from the processing device.

5. The method of claim 1, wherein step (a) further comprises providing the subscriber with additional selectable options in conjunction with the in-vehicle reminder request option that enable the subscriber to associate the in-vehicle reminder request with at least one maintenance, operational, or telematics service request.

6. The method of claim 1, wherein the method further comprises, prior to step (c), the steps of: sending vehicle identification data that uniquely identifies the vehicle associated with the diagnostic information and verifying the vehicle identification data, and wherein step (c) further comprises setting a reminder trigger that is indicative of operation of the vehicle by an occupant.

7. The method of claim 6, wherein the step of setting a reminder trigger comprises setting an ignition trigger.

8. The method of claim 6, wherein the step of setting a reminder trigger comprises setting a mileage trigger.

9. The method of claim 1, further comprising the step of providing the subscriber with a confirmation that the in-vehicle reminder trigger has been set.

10. The method of claim 9, wherein the confirmation comprises a confirmation message sent to the processing device.

11. The method of claim 1, wherein, step (d) further comprises the step of presenting a reminder message in either audible or text form within the vehicle.

12. The method of claim 11, wherein the message includes a request for the occupant to contact the call center.

13. The method of claim 11, wherein step (d) further comprises establishing a wireless communication between the vehicle and a call center in response to occurrence of the in-vehicle reminder trigger.

14. The method of claim 1, wherein step (d) further comprises uploading vehicle data to the call center.

15. The method of claim 1, wherein step (d) further comprises running a vehicle diagnostic check initiated from the call center.

16. The method of claim 1, wherein step (d) further comprises providing a recommendation by the call center to the vehicle occupant to service the vehicle.

17. The method of claim 1, wherein step (d) further comprises setting up an appointment by the call center for the vehicle occupant to service the vehicle at a service dealer.

18. A method of providing a reminder to a subscriber associated with a vehicle via a vehicle telematics unit, comprising the steps of:

(a) sending to a user a communication that contains a user selectable reminder request for an in-vehicle reminder and a virtual button that is displayed at a processing device receiving the communication, the selection of which establishes voice communications between the user and a call center;

(b) receiving the reminder request from the user;

(c) establishing a data session between the call center and the vehicle telematics unit;

(d) sending a trigger that causes the in-vehicle reminder to the vehicle from the call center via the data session;

(e) receiving a call from the vehicle following occurrence of the trigger; and (f) providing additional services to the user concerning the reminder request.

19. The method of claim 18, wherein step (f) further comprises the step of communicating with the user via the call received from the vehicle, and wherein the method further comprises the steps of (g) uploading vehicle data to the call center during the call and (h) running a diagnostic check on the uploaded vehicle data.

20. The method of claim 18, wherein the additional services are provided by a call center advisor.

* * * * *